United States Patent
Heydari et al.

(10) Patent No.: US 12,418,178 B2
(45) Date of Patent: Sep. 16, 2025

(54) ADAPTIVE POWER OSCILLATION DAMPING CONTROLLER FOR A GRID-FORMING CONVERTER

(71) Applicant: Hitachi Energy Ltd, Zürich (CH)

(72) Inventors: Rasool Heydari, Västerås (SE); Hongyang Zhang, Stockholm (SE); Jean-Philippe Hasler, Västerås (SE); Pinaki Mitra, Västerås (SE)

(73) Assignee: Hitachi Energy Ltd, Zurich (CH)

( * ) Notice: Subject to any disclaimer, the term of this patent is extended or adjusted under 35 U.S.C. 154(b) by 0 days.

(21) Appl. No.: 18/869,967

(22) PCT Filed: May 3, 2024

(86) PCT No.: PCT/EP2024/062251
§ 371 (c)(1),
(2) Date: Nov. 27, 2024

(87) PCT Pub. No.: WO2024/231273
PCT Pub. Date: Nov. 14, 2024

(65) Prior Publication Data
US 2025/0174998 A1     May 29, 2025

(30) Foreign Application Priority Data
May 5, 2023 (EP) .................................. 23171854

(51) Int. Cl.
*H02J 3/24* (2006.01)
*H02J 3/38* (2006.01)

(52) U.S. Cl.
CPC ................. *H02J 3/241* (2020.01); *H02J 3/38* (2013.01); *H02J 2300/28* (2020.01)

(58) Field of Classification Search
CPC ....................................................... H02J 3/241
See application file for complete search history.

(56) References Cited

U.S. PATENT DOCUMENTS

| | | | |
|---|---|---|---|
| 2013/0175871 A1* | 7/2013 | Knuppel | H02J 3/48 307/102 |
| 2018/0138708 A1 | 5/2018 | De Rijcke et al. | |

(Continued)

FOREIGN PATENT DOCUMENTS

| | | |
|---|---|---|
| CN | 103858301 A | 6/2014 |
| CN | 108400591 A | 8/2018 |

(Continued)

OTHER PUBLICATIONS

Lai et al., "Frequency Selective Damping of Sub-synchronous Oscillations for Grid-Forming Power Converters", 2021 IEEE Energy Conversion Congress and Exposition (ECCE), 5 pages.

(Continued)

*Primary Examiner* — Nathan L Laughlin
(74) *Attorney, Agent, or Firm* — Procopio, Cory, Hargreaves & Savitch LLP

(57) ABSTRACT

The present disclosure provides a method and a control unit for controlling a power unit connected at a connection point to a power grid. The method comprises obtaining a power oscillation damping (POD) signal from a POD controller, based on a power oscillation in the power grid. A gain value may be determined based on a difference between a first voltage measurement at the connection point and a first voltage reference, or an estimated short circuit ratio of the power grid. The POD signal may be added to an input signal of a power unit regulator to obtain an intermediate reference signal. A combined reference signal may be determined based on adding the POD signal, multiplied by the gain value, to the intermediate reference signal. The power unit may be operated using the determined combined reference signal to damp the oscillation in the grid.

12 Claims, 1 Drawing Sheet

(56) References Cited

U.S. PATENT DOCUMENTS

| | | | |
|---|---|---|---|
| 2018/0138709 A1 | 5/2018 | Hamann | |
| 2022/0102976 A1* | 3/2022 | Roop | H02J 3/24 |
| 2024/0055860 A1* | 2/2024 | Moriano Martín | F03D 7/0272 |
| 2024/0297500 A1* | 9/2024 | Anaparthi | H02J 3/241 |

FOREIGN PATENT DOCUMENTS

| | | |
|---|---|---|
| CN | 113162035 A | 7/2021 |
| CN | 113746096 A | 12/2021 |
| CN | 114123245 A | 3/2022 |
| CN | 114512980 A | 5/2022 |
| CN | 115764992 A | 3/2023 |
| WO | 2022173791 A1 | 8/2022 |
| WO | 2023032554 A1 | 3/2023 |

OTHER PUBLICATIONS

Younis et al., "Wide-Area Damping Control for Inter-Area Oscillations: a Comprehensive Review", 2013 IEEE Electrical Power & Energy Conference (EPEC), Aug. 21, 2013, 6 pages.

Rodriguez-Amenedo et al., "Damping Low-Frequency Oscillations in Power Systems Using Grid-Forming Converters", IEEE Access, vol. 9, Nov. 23, 2021, 14 pages.

Knüppel et al., "Towards a Reactive Power Oscillation Damping Controller for Wind Power Plant Based on Full Converter Wind Turbines", 2012, IEEE Power and Energy Society General Meeting; San Diego, California, USA, Jul. 22-26, 2012, 8 pages.

Zhao et al., "Isolation and Suppression of Forced Oscillations Through Wind Farms Under Grid Following and Grid Forming Control" IEEE Access, May 2021, vol. 9, pp. 76446-76460.

International Search Report and Written Opinion of the International Searching Authority, issued in International Application No. PCT/EP2024/062251, mailed Aug. 13, 2024, 13 pages.

Huang et al., "Damping Low-Frequency Oscillations Through VSC-HVdc Stations Operated as Virtual Synchronous Machines" IEEE Transactions on Power Electronics, vol. 34, No. 6, Jun. 2019, pp. 5803-5818.

Li et al., "Frequency and Voltage Stability Analysis of Grid-Forming Virtual Synchronous Generator Attached to Weak Grid" IEEE Journal of Emerging and Selected Topics in Power Electronics, vol. 10, No. 3, Jun. 2022, pp. 2662-2671.

* cited by examiner

ADAPTIVE POWER OSCILLATION DAMPING CONTROLLER FOR A GRID-FORMING CONVERTER

CROSS-REFERENCE TO RELATED APPLICATIONS

The present application is a national stage entry of International Patent Application No. PCT/EP2024/062251, filed on May 3, 2024, which claims priority to European Patent Application No. 23171854.5, filed on May 5, 2023, which are both hereby incorporated herein by reference as if set forth in full.

TECHNICAL FIELD

The present disclosure relates generally to the field of electric power systems. Specifically, it relates to controlling a power unit.

BACKGROUND

Low-frequency electromechanical inter-area (power) oscillations are common in power systems and grids. These power oscillations are a cause for concern regarding reliable operation of the systems.

Different types of power units, such as synchronous machines, power converters or wind farms/power plants, coupled to the grid may be used to damp such inter-area oscillations. Specifically, the voltage at a connection point between the power grid and a power unit may be modulated using reactive power injection. This functionality is often achieved through a supplementary control function of the power unit, commonly known as Power Oscillation Damping (POD) controller. Conventionally, a POD control signal is added to the voltage reference of an AC voltage regulator of the power unit. As such, the POD signal is used to manipulate a combined voltage reference for the power unit, in order to achieve damping.

In recent years, the request has increased for power converters displaying voltage source behavior, otherwise known as grid-forming behavior. However, the requirements put on a grid-forming power converter, such as stability and supporting the grid for a wide range of short-circuit ratios (SCR), may not be compatible with the conventional POD controller.

For example, in order to achieve a stable performance for a wide range of SCRs, the outer voltage control loop of a grid-forming converter is very slow. The POD control, on the other hand, may require a quicker response time to counteract the power oscillations in the grid.

Further, in some applications, a goal of the POD control is to modulate the PCC voltage in the same phase as the observed inter-area oscillation. However, conventional POD controllers often comprise filters to generate the POD output. These filters frequently cause a phase difference between the input and output of the POD controller. The power unit control loops may provide a further phase difference between the POD controller contribution and the actual output voltage modulation measured at the connection point. These phase delays may together complicate the goal of zero-phase difference between the actual inter-area oscillation and the output voltage modulation. If the phase difference is too large, the POD control may not succeed in damping the inter-area oscillations and, in some cases, may lead to undesired higher frequency oscillations.

SUMMARY

It is therefore an object of the present invention to overcome at least some of the above-mentioned drawbacks, and to provide an improved method and controller for controlling a power unit.

This and other objects are achieved by means of a method and a device as defined in the appended independent claims. Other embodiments are defined by the dependent claims.

According to a first aspect of the present disclosure, a method for controlling a power unit connected at a connection point to a power grid is provided. The method comprises obtaining a power oscillation damping (POD) signal from a POD controller based on a power oscillation in the power grid. The method further comprises determining a gain value based on a difference between a first voltage measurement measured at the connection point and a first voltage reference, or an estimated short-circuit ratio (SCR) of the power grid. The method further comprises adding the POD signal to an input signal of a power unit regulator to obtain an intermediate reference signal from the power unit regulator. The input signal is based on a reference value for the power grid and a corresponding measured value of the power grid. The method further comprises determining a combined reference signal based on adding the POD signal multiplied by the gain value to the intermediate reference signal and operating the power unit using the determined combined reference signal to damp said power oscillation in the grid.

According to a second aspect of the present disclosure, a control unit for a power unit connected at a connection point to a power grid is provided. The control unit comprises a power unit regulator. The control unit is configured to obtain a POD signal from a POD controller based on a power oscillation in the power grid. The control unit is further configured to determine a gain value based on a difference between a first voltage measurement measured at the connection point and a first voltage reference, or an estimated SCR of the power grid. The control unit is further configured to add the POD signal to an input signal of the power unit regulator to obtain an intermediate reference signal from the power unit regulator. The input signal is based on a reference value for the power grid and a corresponding measured value of the power grid. The control unit is further configured to determine a combined reference signal based on adding the POD signal multiplied by the gain value to the intermediate reference signal and operate the power unit using the determined combined reference signal to damp said power oscillation in the grid.

The connection point may for example be a point of common coupling (PCC) or a point of coupling (POC). The first voltage measurement, measured at the connection point, may therefore be equivalent to a PCC voltage.

The POD signal may for example be a voltage or a reactive power signal. The POD signal may be obtained from a POD controller. Such a POD controller may be external to the control unit of the power unit. Alternatively, the control unit of the power unit may comprise a POD controller.

The POD signal is added to the input of the power unit controller. The power unit controller may be configured to provide an output, i.e. the intermediate reference signal, determined to minimize an error represented by the input signal. The error may for example be a difference between a desired (reference) value and a measured value from the grid or the power unit. Adding the POD signal to the input of the power unit controller may provide that the intermediate reference signal is adapted to minimise the power oscillation represented by the POD signal.

However, according to the present control method and the present control unit, the reference signal used to operate the power unit, i.e. the combined reference signal, is further determined based on the POD signal multiplied with a gain. For example, the POD signal may be fed forward to the combined reference signal.

Specifically, the combined reference signal is determined by adding the POD signal multiplied by the gain value to the intermediate reference signal. Thus, the POD signal, scaled by the adaptive gain, may directly affect the combined reference signal. This may further decrease the phase difference between the combined reference signal and the POD signal.

The gain may be based on a difference between a first voltage measurement, measured at the connection point, and a first voltage reference. This addition to the determination of the combined reference signal may minimize the phase shift between the POD signal and the combined reference signal.

The first reference voltage may be a desired voltage at the connection point. The difference between the first voltage measurement and the first voltage reference may in the following be referred to as the first voltage error, as it represents a difference between the desired value and the actual (measured) value of the first voltage. The gain may therefore be adaptively changed based on the first voltage error.

Alternatively, the gain may be based on an estimated short-circuit ratio (SCR) of the grid. The estimated SCR may be received from a dedicated SCR estimation. Such a SCR estimator may be external to the control unit of the power unit. Alternatively, the control unit of the power unit may comprise a SCR estimator.

Adapting the gain based on the SCR may ensure that proper damping is provided in a wide range of short-circuit ratios (SCR). For example, for a grid with higher SCR, the gain may be higher.

The control method of the present disclosure may provide that low-frequency electromechanical power oscillations in the grid are properly damped. In embodiments in which the power unit is a grid-forming power converter, the power oscillations (or "oscillations") may be damped while maintaining a voltage source behavior of the converter for a wide range of SCRs. The present control method may be compatible with grid-forming control, without (or at least with less) undesired interactions with the voltage regulation. Furthermore, with the proposed adaptive POD, the oscillations may be damped with a smaller phase difference between the actual oscillation and voltage modulation, even when the short-circuit ratio varies widely.

According to some embodiments, the determination of the gain value may comprise feeding the difference between the first voltage measurement and the first voltage reference or the estimated SCR into a first controller. The method may further comprise determining the gain value based on an output from the first controller.

According to some embodiments, the control unit may comprise the first controller. The control unit may be further configured to feed the difference between the first voltage measurement and the first voltage reference or the estimated SCR into the first controller and determine the gain value based on an output from the first controller.

Feeding the signals (i.e. the first voltage error or the estimated SCR) into a controller and basing the gain on the output of the controller, may provide further controllability and tunability of the adaptation of the gain. The controller may for example be a PI controller.

According to some embodiments, the method may further comprise obtaining the gain value from a look-up table based on the output from the first controller.

According to some embodiments, the control unit may comprise the look-up table, and the control unit may further be configured to obtain the gain value from the look-up table based on the output from the first controller.

Alternatively, the look-up table may be implemented without the first controller. In such embodiments, the gain value may be obtained from the look-up table based on the first voltage error or the estimated SCR.

According to some embodiments, the power unit regulator may comprise a voltage regulator.

The method may further comprise, obtaining the first reference voltage and the first voltage measurement and determining the input of the power unit regulator based on the first voltage reference and the first voltage measurement.

The control unit may further be configured to obtain the first reference voltage and the first voltage measurement and determine the input of the power unit regulator based on the first voltage reference and the first voltage measurement.

The voltage regulator may be an automatic voltage controller. The voltage regulator may be configured to minimise the first voltage error, i.e. provide a reference signal which is adapted to control the power unit such that the first voltage measurement approaches the first voltage reference.

According to some embodiments, the power unit regulator may comprise a reactive power regulator.

The method may further comprise obtaining a first reactive power measurement, measured at the connection point, and a first reactive power reference. The method may further comprise determining the input of the power unit regulator based on the first reactive power reference and the first reactive power measurement.

The control unit may be further configured to obtain a first reactive power measurement measured at the connection point and a first reactive power reference and determine the input of the power unit regulator based on the first reactive power reference and the first reactive power measurement.

For example, the reactive power regulator may be configured to minimise a first reactive power error based on the first reactive power reference and the first reactive power measurement.

According to some embodiments, the oscillation may be a power oscillation in the range 0.2-2 Hz.

It is noted that other embodiments using all possible combinations of features recited in the above-described embodiments may be envisaged. Thus, the present disclosure also relates to all possible combinations of features mentioned herein.

BRIEF DESCRIPTION OF DRAWINGS

Exemplifying embodiments will now be described in more detail, with reference to the following appended drawings.

As illustrated in the figures, the sizes of the elements and regions may be exaggerated for illustrative purposes and, thus, are provided to illustrate the general structures of the embodiments. Like reference numerals refer to like elements throughout.

DETAILED DESCRIPTION

Exemplifying embodiments will now be described more fully hereinafter with reference to the accompanying drawings in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

Figure 1:
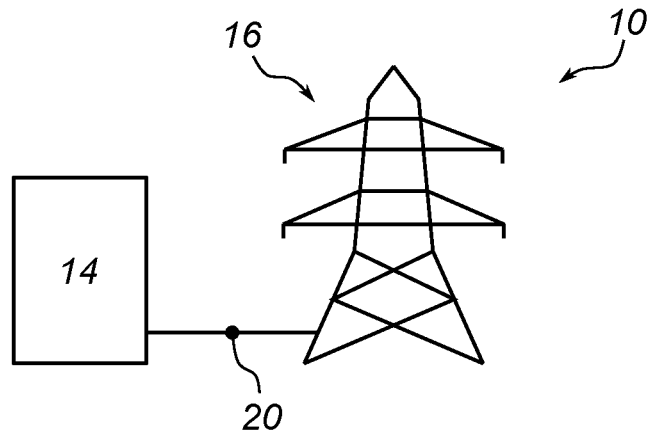
FIG. 1 is a schematic illustration of a grid-forming power electronic converter connected to a power grid, in accordance with some embodiments.

FIG. 1 schematically illustrates a power unit 14 coupled at a connection point 20, to a power grid 16.

The power unit 14 may be a converter. The converter may be arranged to convert (DC or AC) power from a power source to (AC or DC) power suitable for the power grid 16. The converter may be a grid-forming power converter, controlled to emulate a voltage source connected to the coupling point via an impedance.

The power unit 14 may alternatively be a synchronous machine, a wind farm or wind power plant.

Figure 2:
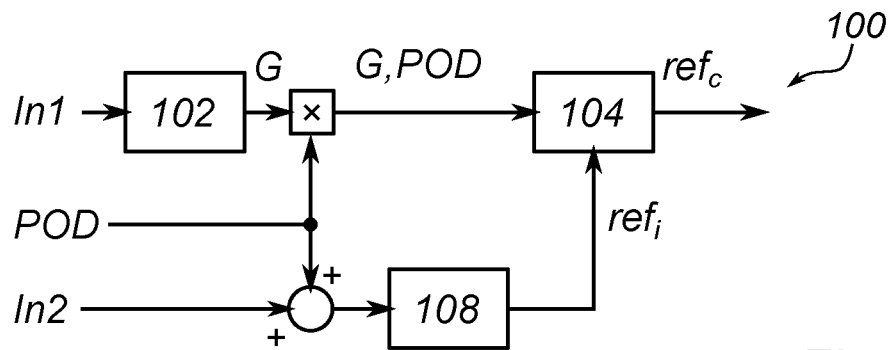
FIG. 2 is a block diagram illustrating a control unit for operating a power unit, in accordance with some embodiments.

FIG. 2 schematically illustrates a control unit 100 for controlling the power unit 14 to provide power oscillation damping (POD) to the grid 16. The control unit 100 may be configured to perform the methods as described by the second aspect of the present disclosure.

The control unit 100 comprises a power unit regulator 108, configured to receive an input signal In2 and provide an (intermediate) reference signal $ref_i$. The POD signal POD is obtained based on a power oscillation observed in the grid 16, for example from a POD controller. The POD signal POD may be based on a measurement made at the connection point 20, such as a voltage measurement or reactive power measurement. The POD signal POD is added to the input signal In2, such that the power oscillation, represented by the POD signal POD, is taken into account by the power unit regulator 108 when calculating/determining the (intermediate) reference signal $ref_i$.

In a voltage control mode, the power unit regulator 108 may be a voltage regulator, such as an AC voltage regulator. The input signal In2 may be a voltage signal. For example, the input signal In2 may be the first voltage error signal.

In a reactive power control mode, the power unit regulator 108 may be a reactive power regulator. The input signal In2 may be a reactive power signal. For example, the input signal In2 may be a first reactive power error signal.

According to the method and the control unit 100 provided by the present disclosure, a combined reference signal $ref_c$ is used to operate the power unit 14. Specifically, a gain value G is determined (in box 102) based on an input In1. The input In1 may be a difference between a first voltage reference signal $U_{ref,1}$ and a first voltage measurement signal $U_1$ measured at the connection point 20. Alternatively, the input I1 may be an estimated short-circuit ratio (SCR) of the grid 16.

The POD signal POD is multiplied with the gain G, to provide a modified POD signal G,POD. The combined reference $ref_c$ is determined (in box 104) based on the intermediate reference signal $ref_i$ and the modified POD signal G,POD.

Figure 3:
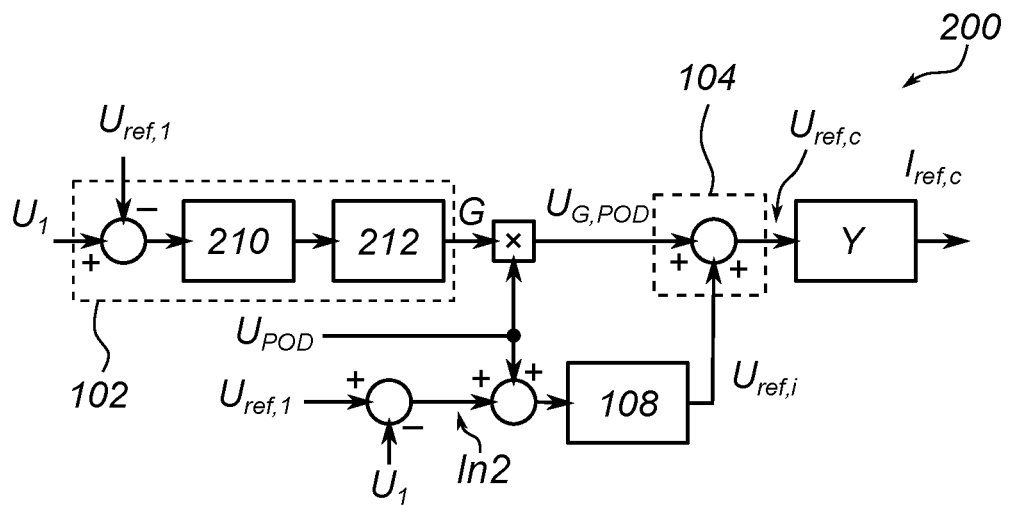
FIG. 3 is a block diagram illustrating a control unit for operating a power unit, in accordance with some embodiments.

FIG. 3 schematically illustrates an example embodiment of a control unit 200 in a voltage control mode. The embodiment illustrated in FIG. 3 includes a plurality of optional features, in accordance with some embodiments. While the below described features are illustrated in the same figure, it will be appreciated that different embodiments may include some, one or none of the features illustrated in FIG. 3.

Firstly, as described above, the gain G is determined in the box 102. The control unit 200 may comprise a first controller 210, which may provide an output based on the difference between the first voltage measurement $U_1$ and the first voltage reference $U_{ref,1}$, i.e. the first voltage error, as shown in FIG. 3. Alternatively, the first controller 210 may alternatively or additionally determine the output based on the estimated SCR. For example, the first controller 210 may be a PI controller. The gain G may be determined based on the output of the first controller 210.

Further, the control unit 200 may further comprise a look-up table 212. The look-up table may relate different input values with appropriate gain values G. In FIG. 3, the look-up table 212 is implemented together with the first controller 210. In such embodiments, the look-up table 212 may relate different output values from the first controller 210 with appropriate gain values G. Alternatively, the look-up table may directly relate the first voltage error or the estimated SCR with appropriate gain values G.

FIG. 3 illustrates a control unit 200 in voltage control mode. In such embodiments, the power unit regulator 108 may comprise a voltage regulator, such as an AC voltage regulator. The input of the voltage regulator is formed by subtracting the first voltage measurement $U_1$ from the first voltage reference $U_{ref,1}$, and adding the POD signal $U_{POD}$, which in the illustrated embodiment is based on a voltage measurement at the grid.

Alternatively, the control unit may be in a reactive power control mode. In such embodiments the first regulator 108 may comprise a reactive power regulator. The reactive power regulator may provide an intermediate reference signal ref based on a first reactive power measurement ($Q_1$, not illustrated), a first reactive power reference ($Q_{ref,1}$, not illustrated) and the POD signal ($Q_{POD}$, not illustrated). The POD signal may be based on a reactive power measurement measured at the grid.

As mentioned above, the combined reference signal ref c is determined based on the intermediate reference signal ref and the modified POD signal G,POD. In FIG. 3, the determination of the combined reference signal $U_{ref,c}$ comprises adding the modified POD signal $U_{G,POD}$ to the intermediate reference signal $U_{ref,i}$.

In FIG. 3, the intermediate reference signal $U_{ref,i}$ and the combined reference signal $U_{ref,c}$ are both voltage reference signals. However, in case the power unit 14 is configured to receive a current reference, combined voltage reference signal $U_{ref,c}$ may be multiplied with a virtual admittance Y, to provide a combined current reference signal $I_{ref,c}$. A combined current reference signal may for example be used for a grid-forming power converter controlled to emulate a voltage source connected to the connection point via an impedance.

The person skilled in the art realizes that the present invention by no means is limited to the preferred embodiments described above. On the contrary, many modifications and variations are possible within the scope of the appended claims.

Although features and elements are described above in particular combinations, each feature or element can be used alone without the other features and elements or in various combinations with or without other features and elements.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

Itemized List of Embodiments

1. A method for controlling a power unit (14) connected at a connection point (20) to a power grid (16), the method comprising:
    obtaining a power oscillation damping, POD, signal (POD) based on an oscillation in the power grid;
    determining a gain value (G) based on:
        a difference between a first voltage measurement ($U_1$) measured at the connection point and a first voltage reference ($U_{ref1}$), or
        an estimated short circuit ratio, SCR, of the power grid;
    adding the POD signal to an input signal (In2) of a power unit regulator (108) to obtain an intermediate reference signal ($ref_i$);
    determining a combined reference signal ($ref_c$) based on the POD signal multiplied by the gain value (G,POD) and the intermediate reference signal; and
    operating the power unit using the determined combined reference signal to damp said oscillation in the grid.
2. The method of item 1, wherein the determination of the gain value comprises:
    feeding the difference between the first voltage measurement and the first voltage reference or the estimated SCR into a first controller; and
    determining the gain value based on an output from the first controller.
3. The method of item 2, further comprising obtaining the gain value from a look-up table based on the output from the first controller.
4. The method of any of the preceding items, wherein the determination of the combined reference signal comprises adding the POD signal multiplied by the gain value to the intermediate reference signal.
5. The method of any of the preceding items, wherein the power unit regulator comprises a voltage regulator and the method further comprises:
    obtaining the first reference voltage and the first voltage measurement; and
    determining the input of the power unit regulator based on the first voltage reference and the first voltage measurement.
6. The method of any of items 1-4, wherein the power unit regulator comprises a reactive power regulator and the method further comprises:
    obtaining a first reactive power measurement measured at the point of coupling and a first reactive power reference; and
    determining the input of the power unit regulator based on the first reactive power reference and the first reactive power measurement.
7. The method of any of the preceding items, wherein the oscillation is a power oscillation in the range 0.2-2 Hz.
8. A control unit for a power unit (14) connected at a connection point (20) to a power grid (16), the control unit comprising a power unit regulator (108), the control unit being configured to:
    obtain a power oscillation damping, POD, signal (POD) based on an oscillation in the power grid;
    determine a gain value (G) based on:
        a difference between a first voltage measurement ($U_1$) measured at the connection point and a first voltage reference ($U_{ref1}$), or
        an estimated short circuit ratio, SCR, of the power grid;
    add the POD signal to an input signal (In2) of the power unit regulator (108) to obtain an intermediate reference signal ($ref_i$);
    determine a combined reference signal ($ref_c$) based on the POD signal multiplied by the gain value (G,POD) and the intermediate reference signal; and
    operate the power unit using the determined combined reference signal to damp said oscillation in the grid.
9. The control unit of item 8, further comprising a first controller, wherein the control unit is further configured to:
    feed the difference between the first voltage measurement and the first voltage reference or the estimated SCR into the first controller; and
    determine the gain value based on an output from the first controller.
10. The control unit of item 9, further comprising a look-up table, the control unit being further configured to obtain the gain value from the look-up table based on the output from the first controller.
11. The control unit of any of the items 9 or 10, wherein the determination of the combined reference signal comprises adding the POD signal multiplied by the gain value to the intermediate reference signal.
12. The control unit of any of the items 8-11, wherein the power unit regulator comprises a voltage regulator, the control unit being further configured to:
    obtain the first reference voltage and the first voltage measurement; and
    determine the input of the power unit regulator based on the first voltage reference and the first voltage measurement.
13. The control unit of any of the items 8-11, wherein the power unit regulator comprises a reactive power regulator, the control unit being further configured to:
    obtain a first reactive power measurement measured at the point of coupling and a first reactive power reference; and
    determine the input of the power unit regulator based on the first reactive power reference and the first reactive power measurement.
14. The control unit of any of the items 8-13, wherein the oscillation is a power oscillation in the range 0.2-2 Hz.

The invention claimed is:

1. A method for controlling a power unit connected at a connection point to a power grid, the method comprising:
    obtaining, from a power oscillation damping (POD) controller, a POD signal based on a power oscillation in the power grid;
    determining a gain value based on:
        a difference between a first voltage measurement, measured at the connection point, and a first voltage reference, or
        an estimated short circuit ratio (SCR) of the power grid;

adding the POD signal to an input signal of a power unit regulator to obtain an intermediate reference signal from the power unit regulator, wherein the input signal is based on a reference value for the power grid and a corresponding measured value of the power grid;

determining a combined reference signal based on adding the POD signal, multiplied by the gain value, to the intermediate reference signal; and operating the power unit using the determined combined reference signal to damp said power oscillation in the power grid.

2. The method of claim 1, wherein the determination of the gain value comprises:

feeding the difference between the first voltage measurement and the first voltage reference or the estimated SCR into a first controller; and determining the gain value based on an output from the first controller.

3. The method of claim 2, further comprising obtaining the gain value from a look-up table based on the output from the first controller.

4. The method of claim 1, wherein the power unit regulator comprises a voltage regulator and the method further comprises:

obtaining the first reference voltage and the first voltage measurement; and determining the input of the power unit regulator based on the first voltage reference and the first voltage measurement.

5. The method of claim 1, wherein the power unit regulator comprises a reactive power regulator and the method further comprises:

obtaining a first reactive power measurement, measured at the connection point, and a first reactive power reference; and determining the input of the power unit regulator based on the first reactive power reference and the first reactive power measurement.

6. The method of claim 1, wherein the power oscillation is a power oscillation in a range 0.2-2 Hz.

7. A control unit for a power unit connected at a connection point to a power grid, the control unit comprising a power unit regulator, the control unit being configured to:

obtain, from a power oscillation damping (POD) controller, a POD signal based on a power oscillation in the power grid;

determine a gain value based on:

a difference between a first voltage measurement, measured at the connection point, and a first voltage reference, or an estimated short circuit ratio (SCR) of the power grid;

add the POD signal to an input signal of the power unit regulator to obtain an intermediate reference signal from the power unit regulator, wherein the input signal is based on a reference value for the power grid and a corresponding measured value of the power grid;

determine a combined reference signal based on adding the POD signal, multiplied by the gain value, to the intermediate reference signal; and operate the power unit using the determined combined reference signal to damp said power oscillation in the owner grid.

8. The control unit of claim 7, further comprising a first controller, wherein the control unit is further configured to:

feed the difference between the first voltage measurement and the first voltage reference or the estimated SCR into the first controller; and determine the gain value based on an output from the first controller.

9. The control unit of claim 8, further comprising a look-up table, the control unit being further configured to obtain the gain value from the look-up table based on the output from the first controller.

10. The control unit of claim 7, wherein the power unit regulator comprises a voltage regulator, the control unit being further configured to:

obtain the first reference voltage and the first voltage measurement; and determine the input of the power unit regulator based on the first voltage reference and the first voltage measurement.

11. The control unit of claim 7, wherein the power unit regulator comprises a reactive power regulator, the control unit being further configured to:

obtain a first reactive power measurement, measured at the connection point, and a first reactive power reference; and determine the input of the power unit regulator based on the first reactive power reference and the first reactive power measurement.

12. The control unit of claim 7, wherein the control unit is configured to obtain the POD signal, from the POD controller, based on a power oscillation in a range 0.2-2 Hz in the power grid.

* * * * *